United States Patent [19]
Lohmann et al.

[11] 3,894,114
[45] July 8, 1975

[54] POLYAMIDE-POLYAMIDE-ACID BLOCK COPOLYMERS

[75] Inventors: Dieter Lohmann, Pratteln; Peter Furrer, Bottmingen; Roland Darms, Therwil; Gerd Greber, Binningen, all of Switzerland

[73] Assignee: Ciba-Geigy Corporation, Ardsley, N.Y.

[22] Filed: Aug. 1, 1973

[21] Appl. No.: 384,643

[30] Foreign Application Priority Data
Aug. 25, 1972 Switzerland...................... 12656/72

[52] U.S. Cl.................260/857 PA; 117/126 AB; 117/126 GB; 117/132 C; 117/138.8 F; 117/138.8 E; 117/138.8 N; 117/138.8 R; 117/143 A; 260/2.5 N; 260/42.17; 260/42.18; 260/47 R; 260/49; 260/65; 260/78 TF; 260/857 TW
[51] Int. Cl.²......................................... C08G 41/04
[58] Field of Search......260/857 PI, 78 TF, 857 TW

[56] References Cited
UNITED STATES PATENTS

| | | | |
|---|---|---|---|
| 3,049,518 | 8/1962 | Stephens........................ | 260/78 TF |
| 3,342,897 | 9/1967 | Abramo........................ | 260/857 PA |
| 3,356,760 | 12/1967 | Matray........................ | 260/857 PA |
| 3,471,444 | 10/1969 | Sherer........................ | 260/78 TF |
| 3,683,047 | 8/1972 | Honda......................... | 260/857 PA |
| 3,683,047 | 8/1972 | Honda......................... | 260/857 TW |
| 3,769,366 | 10/1973 | Fester......................... | 260/857 PA |
| 3,775,379 | 11/1973 | Hausslein..................... | 260/78 TF |
| 3,778,411 | 12/1973 | Emerick....................... | 260/78 TF |

FOREIGN PATENTS OR APPLICATIONS

| | | | |
|---|---|---|---|
| 1,141,023 | 1/1969 | United Kingdom............ | 260/857 G |
| 44-28318 | 11/1969 | Japan........................... | 260/857 TW |
| 1,169,569 | 11/1969 | United Kingdom | |
| 1,312,787 | 4/1973 | United Kingdom | |

*Primary Examiner*—Paul Lieberman
*Attorney, Agent, or Firm*—Charles W. Vanecek; Nestor W. Shust

[57] ABSTRACT

Polyamide-polyamide-acid block copolymers and cyclised derivatives thereof are disclosed which are obtained by reacting a polyamide block having an average molecular weight of from 350 to 20,000 with a polyamide-acid block having an average molecular weight of from 750 to 20,000, the resultant block copolymers being distinguished by good processing characteristics as well as good electrical, thermal and/or mechanical properties.

9 Claims, No Drawings

POLYAMIDE-POLYAMIDE-ACID BLOCK COPOLYMERS

The present invention relates to new polyamide/polyamide-acid block copolymers and the derivatives cyclised to give the corresponding polyamide-polyimide block copolymers, a process for their manufacture and their use for the manufacture of industrial products.

It has been found that new polyamide/polyamide-acid block copolymers possessing good processability coupled with good electrical, thermal and/or mechanical properties, such as high flexural strength or resistance to aging, and consisting of recurring structural elements of the formula I

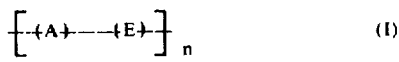

(I)

wherein $n$ represents an integer from 1 to 500, A represents a polyamide block of average molecular weight 350 to 20,000 and having a base unit of the formula II or III

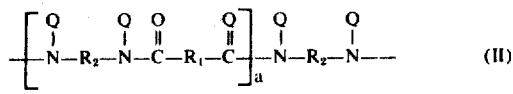

(II)

or

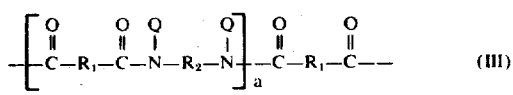

(III)

and E represents a polyamide-acid block with an average molecular weight of 750 to 20,000 and a base unit of the formula IV or V

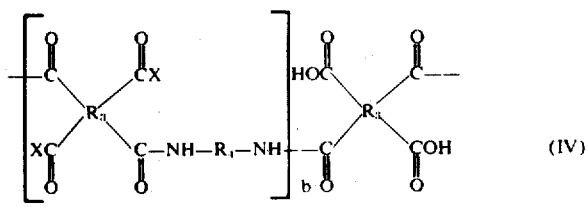

(IV)

or

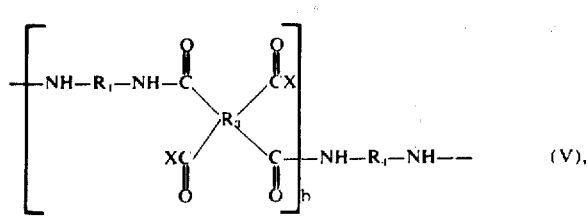

(V), wherein $a$ and $b$ independently of one another denote an integer from 2 to 100, $R_2$ and $R_4$ independently of one another denote a monocyclic, a condensed polycyclic or uncondensed bicyclic aromatic radical in which latter radical the aromatic nuclei are linked to one another through a bridge member, or denote a heterocyclic radical, an aliphatic radical with at least two carbon atoms, a cycloaliphatic radical or an araliphatic radical, $R_1$ represents an aliphatic radical with at least two carbon atoms or a cycloaliphatic, carbocyclic-aromatic or heterocyclic radical, the carbonyl groups being bonded to different carbon atoms, $R_3$ represents a cycloaliphatic, carbocyclic-aromatic or heterocyclic radical, wherein the carbonyl groups are bonded to different ring carbon atoms adjoining one another in pairs, X denotes a hydroxyl, alkoxy or aryloxy group or a radical of the formula

and $Y_1$ and $Y_2$ independently of one another denote hydrogen or an alkyl, cycloalkyl, aryl or aralkyl radical and the radicals

are each located on a ring carbon atom adjoining the carbonamide group and Q denotes hydrogen or an alkyl or aryl radical, and the derivatives cyclised to the corresponding polyamide-polyimide block copolymers can be manufactured by either reacting polyamides of average molecular weight 350 to 20,000, of the formula IIa

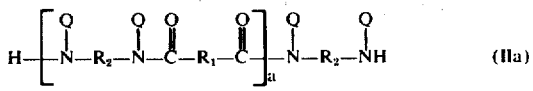

(IIa)

with polyamide-acids of average molecular weight 750 to 20,000, of the formula IVa

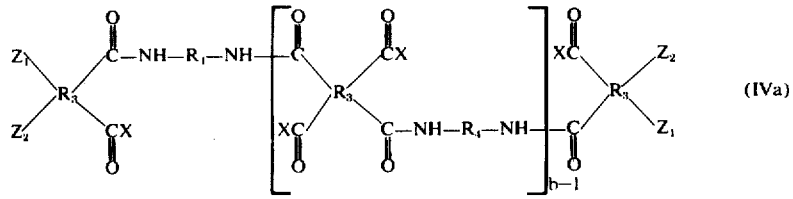

(IVa)

or reacting polyamides of average molecular weight 350 to 20,000, of the formula IIIa

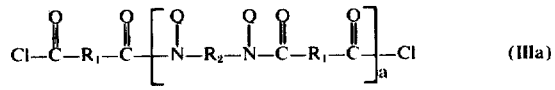

(IIIa)

with polyamide-acids of average molecular weight 750 to 20,000, of the formula Va

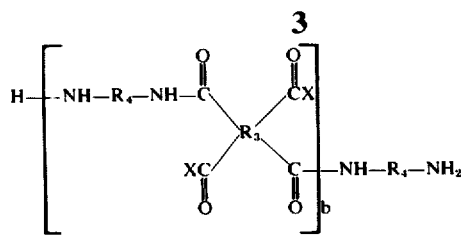

(Va)

wherein what has been stated under formulae II — V applies to a, b, $R_1$, $R_2$, $R_3$, $R_4$, X and Q, $Z_1$ denotes a

group and $Z_2$ denotes a

group, with X' representing chlorine and X" an alkoxy or aryloxy group or a radical of the formula

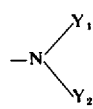

or X' representing an alkoxy or aryloxy group and X" a hydroxyl group or a radical of the formula

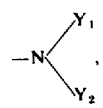

and $Y_1$ and $Y_2$ independently of one another denoting hydrogen or an alkyl, cycloalkyl, aryl or aralkyl radical or $Z_1$ and $Z_2$ together form an anhydride group

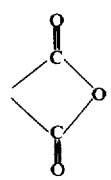

with $Z_1$ and $Z_2$ being located on adjacent ring carbon atoms, and optionally subsequently cyclising the resulting polyamide/ polyamide-acid block copolymers.

Preferably A represents a polyamide block of the formula I or II, wherein $a$ is an integer from 8 to 100.

Polyamide/polyamide-acid block copolymers according to the invention, and the corresponding cyclised derivatives, in general have an inherent viscosity of 0.1 to 2.5, especially of 0.4 to 1.5.

The inherent viscosity $\eta_{inh}$ is calculated from the following equation:

$$\eta_{inh.} = \frac{\ln \frac{\eta}{\eta_o}}{c}$$

In this equation the symbols have the following meaning:

ln = natural logarithm,
$\eta$ = viscosity of the solution (0.5% by weight of the polymer in a suitable solvent, for example N,N-dimethylacetamide, N,N-dimethylformamide, N-methylpyrrolidone or concentrated sulphuric acid),
$\eta_o$ = viscosity of the solvent and
$c$ = concentration of the polymer solution in g of polymer/100 ml of solvent.

The viscosity measurements are carried out at 25°C.

As is generally known, the inherent viscosity is a measure of the molecular weight of a polymer.

In the formulae II to V and IIa to Va, the individual symbols $R_1$, $R_2$, $R_3$ and $R_4$ can have different meanings; it is also possible for several polyamide or polyamide acid blocks which differ from one another but are of consistent structure in themselves to be linked to one another.

If $R_1$ and $R_3$ are carbocyclic-aromatic radicals, these preferably have at least one 6-membered ring; in particular, they are monocyclic radicals, condensed polycyclic radicals, or polycyclic radicals with several cyclic, condensed or non-condensed systems, which can be linked to one another directly or through bridge members.

As examples of suitable bridge members there may be mentioned:

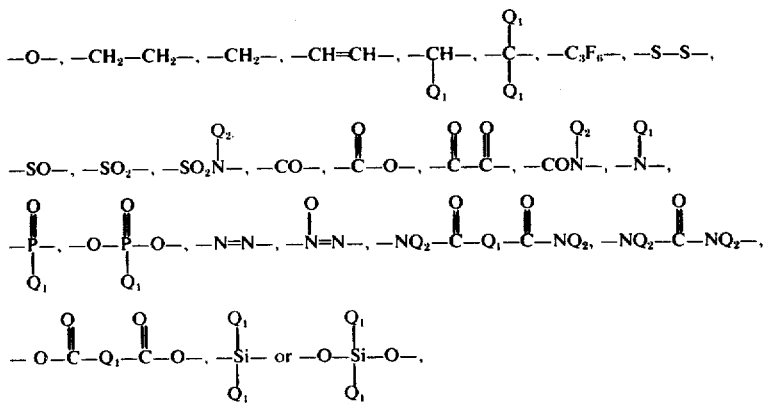

wherein $Q_1$ represents an alkyl radical with 1 to 6, preferably 1 to 4, carbon atoms, which can optionally be substituted by halogen atoms, preferably fluorine, or represents a cycloalkyl or an aryl radical, and $Q_2$ represents hydrogen, an alkyl radical with 1 to 4 carbon atoms, which can optionally be substituted by halogen atoms, a cycloalkyl radical or an aryl radical.

Such radicals can also be bonded to one another through two bridge members, such as two $-SO_2-$ groups.

If $R_1$ and $R_3$ denote heterocyclic radicals, they can in particular be 5-membered heterocyclicaromatic ring systems containing, O, N and/or S, which are optionally benzo-condensed.

Cycloaliphatic radicals represented by $R_1$ or $R_3$ are above all 5-membered or 6-membered cycloalkyl radicals.

Cycloaliphatic, carbocyclic-aromatic or heterocyclic radicals represented by $R_1$ and $R_3$ can also be substituted, for example by nitro groups, alkyl groups with 1 to 4 carbon atoms, trifluoromethyl groups, halogen atoms, especially fluorine, sulphamoyl groups or silyl groups.

If $R_1$ is an aliphatic radical, this is preferably an unsubstituted saturated alkylene radical with 2 to 8, especially 2 to 4, carbon atoms.

Radicals represented by $R_2$ or $R_4$ can also be substituted, for example by halogen atoms, such as fluorine, chlorine or bromine, or by alkyl or alkoxy groups, each with 1 to 4 carbon atoms.

If $R_2$ and/or $R_4$ are uncondensed bicyclic aromatic radicals, possible bridge members are the groups mentioned in the preceding text when discussing $R_1$ and $R_3$. If $R_2$ or $R_4$ denote heterocyclic radicals, these are in particular heterocyclic-aromatic 5-membered or 6-membered rings containing O, N and/or S.

Possible aliphatic radicals $R_2$ and $R_4$ are in particular alkylene radicals with 2 to 12 carbon atoms, and the alkylene chain can also be interrupted by hetero-atoms, such as O, S or N atoms.

If $R_2$ and/or $R_4$ denote a cycloaliphatic radical they represent, for example, cyclohexyl or dicyclohexylmethane radicals, whilst as araliphatic radicals they can above all be 1,3-, 1,4- or 2,4-bis-alkylenebenzene radicals, 4,4'-bis-alkylene-diphenyl radicals and 4,4'-bis-alkylenediphenyl-ether radicals.

Alkoxy groups which X, X' or X'' represent, and alkyl groups which $Y_1$, $Y_2$ or Q represent, preferably have 1 to 4, especially 1 or 2, carbon atoms, whilst aryl, aryloxy or aralkyl groups represented by these symbols are above all unsubstituted phenyl phenoxy, phenethyl and benzyl radicals. Finally, the cyclopentyl and cyclohexyl groups may be mentioned as examples of cycloalkyl radicals $Y_1$ or $Y_2$.

Preferred products are polyamide/polyamide-acid block copolymers of the formula I, wherein A is a polyamide block of the formula III and especially a polyamide block of the formula II and E is a polyamide-acid block of the formula V, especially a polyamide-acid block of the formula IV, wherein a denotes an integer from 8 to 50 and b denotes an integer from 2 to 50, $R_2$ and $R_4$ independently of one another represent a monocyclic aromatic radical which is optionally substituted by halogen atoms, especially chlorine atoms, or by alkyl or alkoxy groups, each with 1 to 4 carbon atoms, an unsubstituted monocyclic araliphatic radical or an unsubstituted aliphatic radical possessing 2 to 10 carbon atoms, but especially an uncondensed bicyclic aromatic radical which is optionally substituted by halogen atoms or by alkyl or alkoxy groups with 1 to 4 carbon atoms each, in which the aromatic nuclei are bonded to one another through the bridge member $-O-$ or $-CH_2-$, $R_1$ denotes an unsubstituted saturated alkylene radical with 2 to 4 carbon atoms or an unsubstituted monocylic aromatic radical, with the carbonyl groups being bonded to different carbon atoms, $R_3$ represents a monocyclic, condnesed polycyclic or uncondensed bicyclic aromatic radical which is optionally substituted by halogen atoms such as fluorine, chlorine or bromine and in which bicyclic aromatic radical the aromatic nuclei are bonded to another through the bridge member

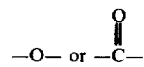

and the carbonyl groups are bonded to different ring carbon atoms adjoining one another in pairs, X represents the hydroxyl group and the radicals

are located on a ring carbon atom adjacent to the carbonamide group and Q represents hydrogen, and the derivatives cyclised to the corresponding polyamide/polyimide block copolymers.

Very particularly preferred compound are polyamide/ polyamide-acid block copolymers of formula I, in which A denotes a polyamide block of the formula II and E denotes a polyamide-acid block of the formula IV, wherein a represents an integer from 8 to 50 and b an interger from 2 to 50, $R_1$ represents the radical of the formula $-CH_2-CH_2-CH_2-CH_2-$ or preferably the 1,3-phenylene radical, $R_2$ represents the 4,4'-diphenyl-ether radical or the 1,3-phenylene radical, $R_3$ represents a benzene ring or the benzophenone ring system, $R_4$ represents the 4,4'-diphenylyl-ether, 4,4'-diphenylylmethane or 1,3- or 1,4-phenylene radical, X represents the hydroxyl group and Q represents hydrogen and the derivatives cyclised to the corresponding polyamide/polyimide block copolymers.

The polyamides and polyamide-acids of the formulae IIa to Va which can be used according to the invention are in themselves known or can be manufactured in a known manner.

For example, polyamides of the formula IIa and polyamide acids of the formula Va can be obtained by reacting dicarboxylic acid derivatives or tetracarboxylic acid derivatives with an excees of diamine. The dicarboxylic acid derivatives used are preferably dicarboxylic acid dihalides, for example terephthalic acid dichloride, thiophene-2,5-dicarboxylic acid dichloride, benzo[1,2-d:5,4-d'] bisoxazole-2,6-dicarboxylic acid dichloride, succinic acid dichloride, glutaric acid dichloride, suberic acid dichloride and especially adipic acid dichloride but about all isophthalic acid dichloride; instead of the acid halides, the free carboxylic acids of their esters can be employed. The tetracarboxylic acid derivatives are preferably used in the form of their anhydrides.

The following may be mentioned as examples of suitable tetracarboxylic acid dianhydrides: pyromellitic acid dianhydride, 3,3', 4,4'-benzophenonetetracarboxylic acid dianhydride, 2,3,3',4'-benzophenonetetracarboxylic acid dianhydride, 2,2',3,3'-benzophenonetetracarboxylic acid dianhydride, 4,4',5,5', 6,6'-hexafluorobenzophenone-2,2',3,3'-tetracarboxylic acid dianhydride, 3,3',4,4'-diphenyl-tetracarboxylic acid dianhydride, 2,2', 3,3'-diphenyl-tetracarboxylic acid dianhydride, bis-(2,3-dicarboxyphenyl)-methane dianhydride, bis-(3,4-dicarboxyphenyl)-methane dianhydride, bis-(2,5,6-trifluoro-3,4-dicarboxyphenyl)-methane dianhydride, 1,1-bis-(3,4-dicarboxyphenyl)-ethane dianhydride, 2,2-bis-(3,4-dicarboxyphenyl)propane dianhydride, 2,2-bis-(2,3-dicarboxyphenyl)-propane dianhydride, bis-(3,4-dicarboxyphenyl)-ether dianhydride, bis-(2,3-dicarboxyphenyl)-ether dianhydride, bis-(2,5,6-trifluoro-3,4-dicarboxylphenyl)-ether dianhydride, bis-(3,4-dicarboxyphenyl)-sulphone dianhydride, bis-(2,5,6-trifluoro-3,4-dicarboxyphenyl)-sulphone dianhydride, bis-(3,4-dicarboxyphenyl)-phenylphosphonate dianhydride, bis-(3,4-dicarboxyphenyl)-phenylphosphine oxide dianhydride, N,N-(3,4-dicarboxyphenyl)-N-methylamine dianhydride, bis-(3,4-dicarboxyphenyl)-diethylsilane dianhydride, bis-(3,4-dicarboxyphenyl)-tetramethyldisiloxane dianhydride, 3,3',4,4'-tetracarboxybenzoyloxybenzene dianhydride, 1,4,5,8-naphthalene-tetracarboxylic acid dianhydride, 2,3,6,7-napthalene-tetracarboxylic acid dianhydride, 1,2,5,6-naphthalene-tetracarboxylic acid dianhydride, 2,6-dichloronapthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, 1,4,5,8-tetrafluornaphthalene-2,3,6,7-tetracarboxylic acid dianhydride, phenanthrene-1,8,9,10-tetracarboxylic acid dianhydride, 3,4,9,10-perylene-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, tetrahydrofurane-2,3,4,5-tetracarboxylic acid dianhydride, 3,3', 4,4'-azobenzene-tetracarboxylic acid dianhydride, 3,3',4,4'-azoxybenzene-tetracarboxylic acid dianhydride, 1,2,3,4-cyclopentanetetracarboxylic acid dianhydride and dianhydrides of the formula

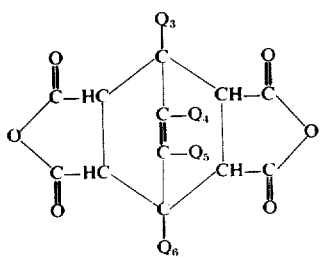

in which $Q_3$, $Q_4$, $Q_5$ and $Q_6$ independently of one another denote hydrogen, halogen, alkyl, cycloalkyl, phenyl, aralkyl, acyl or an optionally esterified or etherified hydroxyl group, for example bicyclo[2.2.2]octene-7-tetracarboxylic acid 2,3,5,6-dianhydride.

Instead of the abovementioned anhydrides it is also possible to use the corresponding tetracarboxylic acid diester-dihalides, tetracarboxylic acid diester-diamides, tetracarboxylic acid diamide-dihalides or tetracarboxylic acid diesters. pyromellitic acid dianhydride and benzophenonetetracarboxylic acid dianhydrides are preferred.

Polyamides of the formula IIIa can be obtained by reaction of diamines with an excess of a dicarboxylic acid dichloride, such as adipic acid dichloride or isophthalic acid dichloride.

To manufacture polyamide-acids of the formula IVa diamines are reacted with an excess of a suitable tetracarboxylic acid derivative, preferably in the form of an anhydride, for example the tetracarboxylic acid dianhydrides previously mentioned. Pyromellitic acid dianhydride and benzophenonetetracarboxylic acid dianhydrides are used preferentially.

As diamines for the manufacture of polyamides or polyamide-acids of the fomulae IIa to Va it is possible to use diamines of the formulae $H_2N—R_4—NH_2$ and

which are in themselves known, wherein $R_2$, $R_4$ and Q have the indicated meaning.

As specific examples of aromatic diamines conforming to the definition there may be mentioned: o-, m- and p- phenylenediamine, diaminotoluenes, such as 2,4-diaminotoluene, 1,4-diamino-2-methoxybenzene, 2,5-diaminoxylene, 1,3-diamino-4-chlorobenzene, 1,4-diamino-2,5-dichlorobenzene, 1,4-diamino-2-bromobenzene, 1,3-diamino-4-isopropylbenzene, N,N'-diphenyl-1,4-phenylenediamine, 4,4'-diaminodiphenyl2,2-propane, 4,4'-diaminodiphenylmethane, 2,2'- or 4,4'-diaminostilbene, 4,4'-diamino-2,2',3,3',5,5', 6,6'-octafluorodiphenylmethane, 4,4'-diaminodiphenylether, 4,4'-diamino-2,2', 3,3',5,5',6,6'-octafluorodiphenyl-ether, 4,4'-diaminodiphenyl-thioether, 4,4'-diaminodiphenylsulphone, 3,3'-diaminodiphenylsulphone, 4,4'-diaminobenzoic acid phenyl ester, 2,2'- or 4,4'-diaminobenzophenone, 4,4'-diaminobenzil, 4-(4'-aminophenylcarbamoyl)-aniline, bis-(4-aminophenyl)-phosphine oxide, bis-(4-aminophenyl)-methylphosphine oxide, bis-(3-aminophenyl)-methylphosphine oxide, bis-(4-aminophenyl)-phenylphosphine oxide, bis-(4-aminophenyl)-cyclohexylphosphine oxide, N,N-bis-(4-aminophenyl)-N-phenylamine, N,N-bis-(4-aminophenyl)-N-methylamine, 2,2', 3,3'-or 4,4'-diaminoazobenzene, 4,4'-diaminodiphenylurea, 1,8- or 1,5-diaminonaphthalene, 1,5-diaminoanthraquinone, diamino-fluoranthene, 3,9-diaminochrysene, diaminopyrene, bis-(4-aminophenyl)-diethylsilane, bis-(4aminophenyl)-dimethylsilane and bis-(4-aminophenyl)-tetramethyldisiloxane.

As compounds of the formula

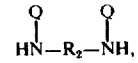

4,4'-diaminodiphenyl-ether and 1,3-phenylenediamine are particularly preferred, whilst as compounds of the formula $H_2N—R_4—NH_2$, 4,4'-diaminodiphenyl-ether, 4,4'-diaminodiphenylmethane or 1,3- or 1,4-phenylenediamine are particularly preferred.

Examples of heterocyclic-aromatic diamines are: 2,6-diaminopyridine, 2,4-diaminopyrimidine, 3,6-diaminoacridine, 2,4-diamino-s-triazine, 2,7-diaminodibenzofurane, 2,7-diaminocarbazole, 3,7-diaminophenothiazine, 5,6-diamino-1,3-dimethyluracil and 2,5-diamino-1,3,4-thiadiazole.

As aliphatic diamines there may be mentioned: dimethylenediamine, trimethylenediamine, tetramethylenediamine, hexamethylenediamine, heptamethylenediamine, octamethylenediamine, nonamethylenediamine and decamethylenediamine, 2,2-dimethylpropylenediamine, 2,5-dimethylhexamethylenediamine, 2,5-dimethylheptamethylenediamine, 4,4-dimethylheptamethylenediamine, 3-methylheptamethylenediamine, 3-methoxyhexamethylenediamine, 5-methylnonamethylenediamine, 2,11-diaminododecane, 1,12-diaminooctadecane, 1,2-bis-(3-aminopropoxy)-ethane, N,N'-dimethylethylnediamine, N,N'-diethyl-1,3-diaminopropane and N,N'-dimethyl-1,6-diaminohexane as well as the diamines of the formulae $H_2N(CH_2)_3O(CH_2)_2O(CH_2)_3NH_2$ and $H_2N(CH_2)_3S(CH_2)_3NH_2$.

Finally, 1,4-diaminocyclohexane and 4,4'-diaminodicyclohexylmethane should be mentioned as suitable cycloaliphatic diamines and 1,4-bis-(2-methyl-4-aminopentyl)-benzene, 1,4-bis-(1,1-dimethyl-5-aminopentyl)-benzene, 1,3- or 1,4-bis-(aminomethyl)-benzene, 2,4-bis-[(2'-amino-1',1'-dimethyl)-ethyl]-toluene and bis-[4-(2'-amino-1',1'-dimethyl)-ethylphenyl]-ether should be mentioned as araliphatic diamines.

The polycondensation of the dicarboxylic acid derivatives or the tetracarboxylic acid derivatives with the diamines can be carried out in a manner which is in itself known, preferably in an anhydrous organic solvent and with exclusion of moisture, for example under nitrogen, at temperatures between about −20°C and +50°C, especially about −15°C to +10°C. Suitable organic solvents are N,N-dimethylacetamide, N,N-diethylacetamide, N,N-dimethylformamide, N,N-dimethylmethoxyacetamide, N-methyl-2-pyrrolidone, N-acetyl-2-pyrrolidone, N-methyl-ε-caprolactam, hexamethylphosphoric acid triamide (hexametapol), N,N,N',N'-tetramethylurea, tetrahydrothiophene dioxide (sulpholane) and dimethylsulphoxide.

The reaction can also be carried out in mixtures of such solvents. On the other hand it is also possible to dilute these preferred solvent systems with other organic aprotic solvents, such as aromatic, cycloaliphatic or aliphatic, optionally chlorinated, hydrocarbons, for example benzene, toluene, xylenes, cyclohexane, pentane, hexane, petroleum ether, methylene chloride, tetrahydrofurane, cyclohexanone and dioxane.

The polyamide or polyamide-acid blocks can also be manufactured by interfacial polycondensation, for example by reaction of appropriate dicarboxylic acid derivates or tetracarboxylic acid derivatives with diamines in a mixture of water, N,N-dimethylacetamide and tetrahydrofurane.

The condensation of the resulting polyamide blocks with the polyamide-acid blocks is appropriately carried out by combining the solution of polyamide block of the formula IIa or IIIa, advantageously with exclusion of moisture, for example under nitrogen, with the solution of a polyamide-acid block of the formula IVa or Va and allowing these to react at a temperature between about 10° and 30 °C. The reaction of a polyamide block of the formula IIa with a polyamide-acid block of the formula IVa is preferred.

After completion of the reaction the solvents can be removed in the usual manner if desired, for example by distillation, if appropriate under reduced pressure. Block copolymers according to the invention can however also be precipitated according to known methods by pouring the reaction solution into a precipitant, such as water or aliphatic hydrocarbons, for example petroleum ether, but especially methanol, diethyl ether, diethers of monoethylene glycol, diethylene glycol or triethylene glycol, or acetonitrile and the like, and be dried if desired.

The cyclisation fo the polyamide/polyamide-acid block copolymers obtained according to the invention to give the corresponding polyamide-polyimide block copolymers - before, during or after processing - is also carried out in a manner which is in itself known, thermally or by chemical methods, for example by heating to temperatures between 50° and 300°C, or by treatment with a dehydrating agent by itself or mixed with a tertiary amine; examples to be mentioned are acetic anydride, propionic anhydride and dicyclohexylcarbodiimide or a mixture of acetic anhydride and triethylamine or pyridine.

The block copolymers manufactured according to the invention are distinguished by good processability and can be used in a technically simple manner, which is in itself known, for the manufacture of industrial products such as fibres, fibre-reinforced composite materials, layered materials, castings, laminates, honeycomb core material, lacquers, adhesives, foams, coating compositions, paper and the like but can especially be used for the manufacture of films (sheets), compression moulding powders and pressings.

For these purposes, customary additives, such as pigments, fillers, electrical conductors, for example carbon black or metal particles, agents for improving the abrasion resistance, lubricants or reinforcing fibres, for example carbon fibres, boron fibres or glass fibres, can be added to the block copolymers before or after shaping. For example, foams are obtained by adding customary blowing agents, and optionally fillers, to the polymers before processing or by blowing air, carbon dioxide, nitrogen or the like into the polymer mass or polymer solution. Laminates which contain block copolymers according to the invention can optionally be provided with coating layers which improve the surface properties, for example layers of phenolic resins, aluminium and the like, and are used, inter alia, in aircraft construction.

Block copolymers conforming to the definition, preferably in the form of solutions, can also be used as coating compositions and adhesives and the like, optionally with the addition of pigments, such as titanium dioxide and the customary fillers and foaming agents and the like, for covering and coating substrates of the most diverse kind in any desired shape, such as films, fibres, fibre fleeces, wires, grid-like structures, fabrics, foams and the like. As suitable substrates there may be mentioned: metals, such as copper, brass, aluminium, iron and steel; asbestos fibre materials and glass fibre materials; polymers, such as cellulosic materials (cellulose esters or cellulose ethers, paper and the like); perfluorocarbon polymers, such as polytetrafluoroethylene; polyolefines, polyesters, polyamides, polyimides, polyurethanes and the like.

EXAMPLE 1

A. Manufacture of a polyamide block with amino end groups 8.510 g (0.0425 mol) of 4,4'-diaminodiphenyl-ether are dissolved in 100 g of anhydrous N,N-dimethylacetamide in a 500 ml sulphonation flask equipped with a stirrer, internal thermometer, dropping funnel with pressure compensator and nitrogen inlet tube. 8.132 g (0.040 mol) of isophthalic acid dichloride in the solid form are introduced in portions into the resulting soltuion whilst cooling to between −15°C and −5°C with acetone/solid carbon dioxide, and the reaction mixture is kept for one hour at −5°C and subsequently for 3 hours at 20°–25°C. A solution of 8.096 g (0.08 mol) of triethylamine in 50 g of anhydrous N,N-dimethylacetamide is then added dropwise at 5°–10°C in order to react with the hydrogen chloride produced. After stirring for one hour at room temperature (approx. 25°C) the triethylamine hydrochloride which has precipitated is filtered off under nitrogen by means of a glass frit and is subsequently washed carefully three times with a little anhydrous N,N-dimethylacetamide.

B. Manufacture of a polyamide-acid block with anhydride end groups

In an apparatus of the type described under A), 2.726 g (0.0125 mol) of pyromellitic acid dianhydride are suspended in 50 g of anhydrous N,N-dimethylacetamide under nitrogen. A solution of 2.002 g (0.01 mol) of 4,4'-diaminodiphenyl-ether in 50 g of anhydrous N,N-dimethylacetamide is then added dropwise at 5°–20°C, in the course of which the pyromellitic acid dianhydride slowly dissolves. Thereafter the reaction mixture is stirred for 1 hour at 20°–25°C.

Manufacture of the polyamide-polyimide block copolymer

The soltuion of a polyamide with amino end groups, obtained according to (A), is added dropwise over the course of 10 minutes to the solution, obtained according to (B), of a polyamide-acid with anhydride end groups, at 5°–10°C, under nitrogen. Thereafter the reaction mxiture is stirred for 2 hours at 20°–25°C. A solution of a polyamide/polyamide-acid block copolymer with an inherent viscosity of 1.32 dl/g (c = 0.5% in N,N-dimethylacetamide) is obtained, which can be converted into films in a manner which is in itself known, for example by casting the solution on a glass plate, next removing most of the solvent of 70°–150°C/20 mm Hg and subsequently subjecting the films to a heat treatment for approx. 5 hours at 200° – 250°C/0.1 mm Hg. In the course thereof, the polyamide-acid blocks are cyclised to polyimide blocks and films of the corresponding polyamide-polyimide-block copolymers are obtained; $\overline{M}_{PA}$ 5,500, $\overline{M}_{PI}$ 2,000.

Here, and in the following text, the meaning of the symbols is:
$\overline{M}$ = average molecular weight;
pA = polyamide block;
PAA = polyamide-acid block;
PI = polyimide block.

Fibres of the polyamide-polyimide-block copolymers mentioned can be obtained by extrusion of the polymer solution, obtained according to (C), into water or diethyl ether or into mixtures of these precipitants with other organic solvents, such as methanol, followed by heat treatment of the resulting filaments at 200°–250°C/0.1 mm Hg of dry spinning at temperatures between 200° and 300°C.

Tables I and II which follow list further polyamide/-polyamide-acid block copolymers (PA-PAA) and polyamide-polyimide-block copolymers (PA-PI) which were obtained according to the process described in Example 1.

Table I

| Ex. No. | Block size $\overline{M}_{PA}$ | $\overline{M}_{PAA}$ | m-Phenylene-diamine (g/mol) | Isophthalic acid dichloride (g/mol) | Triethyl-amine (g/mol) | Pyromellitic acid dianhydride (g/mol) | 4,4'-Diamino-diphenyl-ether (g/mol) | $\eta_{inh}$ (dl/g) (0.5% in DMA) PA-PAA | $\eta_{inh}$ (dl/g) (0.5% in conc. $H_2SO_4$) PA-PI |
|---|---|---|---|---|---|---|---|---|---|
| 2 | 1,000 | 1,000 | 5.4070/0.05 | 8.132/0.4 | 8.096/0.08 | 6.27/0.03 | 4.004/0.02 | 0.50 | 0.54 |
| 3 | " | 2,000 | 5.4070/0.05 | 8.132/0.04 | 8.096/0.08 | 10.906/0.05 | 8.009/0.04 | | 0.61 |
| 4 | " | 3,000 | 5.4070/0.05 | 8.132/0.04 | 8.096/0.08 | 17.450/0.08 | 14.015/0.07 | | 0.88 |
| 5 | " | 4,000 | 2.7035/0.025 | 4.066/0.02 | 4.048/0.04 | 10.906/0.05 | 9.0099/0.045 | | 0.79 |
| 6 | " | 5,000 | 2.7035/0.025 | 4.066/0.02 | 4.048/0.04 | 14.1778/0.065 | 12.0132/0.06 | 1.54 | 0.90 |
| 7 | " | 10,000 | 2.7035/0.025 | 4.066/0.02 | 4.048/0.04 | 27.265/0.125 | 24.0264/0.12 | | 0.80 |
| 8 | " | 20,000 | 2.7035/0.025 | 4.066/0.02 | 4.048/0.04 | 53.439/0.245 | 48.052/0.24 | 1.48 | 0.74 |
| 9 | 2,000 | 1,000 | 4.866/0.045 | 8.132/0.04 | 8.096/0.08 | 3.272/0.015 | 2.002/0.01 | | 0.75 |
| 10 | " | 2,000 | 4.866/0.045 | 8.132/0.04 | 8.096/0.08 | 5.453/0.025 | 4.004/0.02 | | 0.66 |
| 11 | " | 3,000 | 4.866/0.045 | 8.132/0.04 | 8.096/0.08 | 8.725/0.04 | 7.007/0.035 | 0.97 | 0.81 |
| 12 | " | 4,000 | 4.866/0.045 | 8.132/0.04 | 8.096/0.08 | 10.906/0.05 | 9.0099/0.045 | | 0.96 |
| 13 | " | 5,000 | 4.866/0.045 | 8.132/0.04 | 8.096/0.08 | 14.1778/0.065 | 12.0132/0.06 | | 0.85 |
| 14 | " | 10,000 | 2.4331/0.0225 | 4.0662/0.02 | 4.048/0.04 | 13.632/0.0625 | 12.0132/0.06 | | 0.76 |
| 15 | 2,000 | 20,000 | 2.4331/0.0225 | 4.0662/0.02 | 4.048/0.04 | 26.7197/0.1225 | 24.0264/0.12 | | 0.85 |
| 16 | 3,000 | 1,000 | 7.029/0.065 | 12.198/0.06 | 12.144/0.12 | 3.272/0.015 | 2.002/0.01 | | 0.91 |
| 17 | " | 2,000 | 7.029/0.065 | 12.198/0.06 | 12.144/0.12 | 5.453/0.025 | 4.004/0.02 | 0.70 | 0.93 |
| 18 | " | 3,000 | 7.029/0.065 | 12.198/0.06 | 12.144/0.12 | 8.725/0.04 | 7.007/0.035 | | 0.83 |
| 19 | " | 4,000 | 7.029/0.065 | 12.198/0.06 | 12.144/0.12 | 10.906/0.05 | 9.009/0.045 | | 0.91 |
| 20 | " | 5,000 | 3.5145/0.0325 | 6.0990/0.03 | 6.072/0.06 | 7.088/0.0325 | 6.006/0.03 | 1.02 | 0.77 |
| 21 | 4,000 | 1,000 | 4.596/0.0425 | 8.132/0.04 | 8.096/0.08 | 1.636/0.0075 | 1.001/0.005 | | 0.91 |
| 22 | " | 2,000 | 4.596/0.0425 | 8.132/0.04 | 8.096/0.08 | 2.726/0.0125 | 2.002/0.01 | 0.67 | 0.78 |
| 23 | " | 3,000 | 4.596/0.0425 | 8.132/0.04 | 8.096/0.08 | 4.362/0.02 | 3.504/0.0175 | | 0.80 |
| 24 | " | 4,000 | 4.596/0.0425 | 8.132/0.04 | 8.096/0.08 | 5.453/0.025 | 4.504/0.0225 | | 0.77 |
| 25 | " | 5,000 | 4.596/0.0425 | 8.132/0.04 | 8.096/0.08 | 7.088/0.0325 | 6.006/0.03 | | 0.83 |
| 26 | 5,000 | 1,000 | 11.895/0.11 | 21.346/0.1105 | 21.252/0.21 | 3.272/0.015 | 2.002/0.01 | 0.68 | 0.89 |
| 27 | " | 2,000 | 11.895/0.11 | 21.346/0.1105 | 21.252/0.21 | 5.453/0.025 | 4.004/0.02 | | 0.98 |
| 28 | 5,000 | 3,000 | 5.9477/0.055 | 10.6732/0.0525 | 10.626/0.105 | 4.3624/0.02 | 3.5038/0.0175 | | 0.60 |
| 29 | " | 4,000 | 5.9477/0.055 | 10.6732/0.0525 | 10.626/0.105 | 5.453/0.025 | 4.505/0.0225 | | 0.6 |
| 30 | " | 5,000 | 5.9477/0.055 | 10.6732/0.0525 | 10.626/0.105 | 7.088/0.0325 | 6.006/0.03 | 0.95 | 0.52 |
| 31 | " | 10,000 | 5.9477/0.055 | 10.6732/0.0525 | 10.626/0.105 | 13.6325/0.0625 | 12.0132/0.06 | | 0.98 |
| 32 | " | 20,000 | 5.9477/0.055 | 10.6732/0.0525 | 10.626/0.105 | 26.7197/0.1225 | 24.0264/0.12 | 0.89 | 0.75 |
| 33 | 8,000 | 1,000 | 9.462/0.0875 | 17.258/0.085 | 18.204/0.17 | 1.636/0.0075 | 1.001/0.005 | | 0.79 |

Table I—Continued

| Ex. No. | Block size $\bar{M}_{PA}$ | $\bar{M}_{PAA}$ | m-Phenylene-diamine (g/mol) | Isophthalic acid dichloride (g/mol) | Triethyl-amine (g/mol) | Pyromellitic acid dianhydride (g/mol) | 4,4'-Diamino-diphenyl-ether (g/mol) | $\eta_{inh.}$ (dl/g) (0.5% in DMA) PA-PAA | $\eta_{inh.}$ (dl/g) (0.5% in conc. $H_2SO_4$) PA-PI |
|---|---|---|---|---|---|---|---|---|---|
| 34 | '' | 2,000 | 9.462/0.0875 | 17.258/0.085 | 18.204/0.17 | 2.727/0.0125 | 2.002/0.01 | | 0.68 |
| 35 | '' | 5,000 | 9.462/0.0875 | 17.258/0.085 | 18.204/0.17 | 6.544/0.03 | 5.506/0.0275 | | 0.78 |
| 36 | 20,000 | 2,000 | 22.980/0.2125 | 42.636/0.21 | 42.504/0.42 | 2.727/0.0125 | 2.002/0.01 | | 0.8 |
| 37 | '' | 5,000 | 22.980/0.2175 | 42.636/0.21 | 42.504/0.42 | 6.544/0.03 | 5.506/0.0275 | | 0.90 |

Table II

| Ex. No. | POLYAMIDE BLOCK prepared from: | | | $\bar{M}_{PA}$ | POLYAMIDE-ACID BLOCK prepared from: | | $\bar{M}_{PAA}$ | $\eta_{inh.}$ (dl/g) (0.5% in DMA) PA-PAA |
|---|---|---|---|---|---|---|---|---|
| 38 | 10.814 g (0.1 mol) of m-phenylene-diamine | 14.643 g (0.08 mol) of adipic acid dichloride | 16.19 g (0.16 mol) of triethylamine | 1,000 | 13.0864 g (0.06 mol) of pyromellitic acid dianhydride | 8.0088 g (0.04 mol) of 4,4'-diamino-diphenyl-ether | 1,000 | |
| 39 | 9.269 g (0.065 mol) of 1,3-diamino-4-chlorobenzene | 12.1818 g (0.06 mol) of isophthalic acid dichloride | 12.144 g (0.12 mol) of triethylamine | 4,500 | 5.453 g (0.025 mol) of pyromellitic acid dianhydride | 5.344 g (0.02 mol) of 4,4'-diamino-3,3'-dichloro-diphenyl-methane | 2,200 | |
| 40 | ditto | ditto | ditto | 4,500 | ditto | 4.004 g (0.02 mol) of 4,4'-diamino-diphenyl-ether | 2,000 | |
| 41 | 7.029 g (0.065 mol) of m-phenylene-diamine | ditto | ditto | 3,000 | ditto | 5.344 g (0.02 mol) of 4,4'-diamino-3,3'-dichloro-diphenyl-methane | 2,200 | |
| 42 | ditto | ditto | ditto | 3,000 | 2.725 g (0.0125 mol) of pyromellitic acid dianhydride + 4.028 g (0.0125 mol) of 3,3',4,4'-benzo-phenonetetracar-boxylic acid di-anhydride (=BTDA) | 4.004 g (0.02 mol) of 4,4'-diaminodi-phenyl-ether | 2,100 | |
| 43 | 7.029 g (0.065 mol) of m-phenylene-diamine | 12.1818 g (0.06 mol) of isophthalic acid dichloride | 12.144 g (0.12 mol) of triethylamine | 3,000 | 8.0554 g (0.025 mol) of BTDA | 4.004 g (0.02 mol) of 4,4'-diamino-diphenyl-ether | 2,000 | 0.94 |
| 44 | ditto | ditto | ditto | 3,000 | 5.453 g (0.025 mol) of pyromellitic acid dianhydride | 3.9654 g (0.020 mol) of 4,4'-diamino-diphenyl-methane | 2,000 | 1.14 |
| 45 | ditto | ditto | ditto | 3,000 | 8.0554 g (0.025 mol) of BTDA | ditto | 2,000 | 1.05 |
| 46 | 4.8663 g (0.045 mol) of m-phenylene-diamine | 8.1212 g (0.040 mol) of isophthalic acid dichloride | 8.0952 g (0.080 mol) of triethylamine | 2,000 | 8.7252 g (0.040 mol) of pyromellitic acid dianhydride | 6.9394 g (0.035 mol) of 4,4'-diamino-diphenyl-methane | 3,000 | 1.10 |
| 47 | ditto | ditto | ditto | 2,000 | 12.8892 g (0.040 mol) of BTDA | 7.0084 g (0.035 mol) of 4,4'-diamino-diphenyl-ether | 3,000 | 0.65 |
| 48 | ditto | ditto | ditto | 2,000 | ditto | 6.9394 g (0.035 mol) of 4,4'-diaminodi-phenyl-methane | 3,000 | 1.01 |
| 49 | 11.3547 g (0.105 mol) of m-phenylene-diamine | 20.303 g (0.1 mol) of isophthalic acid dichloride | 20.238 g (0.2 mol) of triethylamine | 5,000 | 4.3626 g (0.02 mol) of pyromellitic acid dianhydride | 1.7431 g (0.015 mol) of hexamethylene-diamine | 1,000 | 0.30 |
| 50 | ditto | ditto | ditto | 5,000 | 6.4446 g (0.02 mol) of BTDA | 2.5848 g (0.015 mol) of decamethylene-diamine | 1,500 | 0.40 |
| 51 | 17.8431 g (0.165 mol) of m-phenylene-diamine | 31.9772 g (0.1575 mol) of isophthalic acid dichloride | 31.8748 g (0.315 mol) of triethylamine | 5,000 | 7.2503 g (0.0225 mol) of BTDA | 3.0036 g (0.015 mol) of 4,4'-diamino-diphenyl-ether | 1,000 | 1.00 |
| 52 | 25.5306 g (0.1275 mol) of 4,4'-diamino-diphenyl-ether | 24.3636 g (0.120 mol) of isophthalic acid dichloride | 24.2856 g (0.240 mol) of triethylamine | 5,500 | 2.0836 g (0.0375 mol) of BTDA | 6.0072 g (0.030 mol) of 4,4'-diamino-diphenyl-ether | 2,000 | 0.81 |
| 53 | 13.9501 g (0.129 mol) of m-phenylene-diamine | 25.5828 g (0.126 mol) of isophthalic acid dichloride | 25.4999 g (0.252 mol) of triethylamine | 10,000 | 4.8335 g (0.015 mol) of BTDA | 2.4029 g (0.012 mol) of 4,4'-diamino-diphenyl-ether | 2,000 | 0.91 |

Table II—Continued

| Ex. No. | POLYAMIDE BLOCK prepared from: | | | $\bar{M}_{PA}$ | POLYAMIDE-ACID BLOCK prepared from: | | $\bar{M}_{PAA}$ | $\eta_{inh}$ (dl/g) (0.5% in DMA) PA-PAA |
|---|---|---|---|---|---|---|---|---|
| 54 | 22.7974 g (0.165 mol) of 2,4-diamino-anisole | 31.9772 g (0.1575 mol) of isophthalic acid dichloride | 31.8748 g (0.315 mol) of triethylamine | 5,000 | 7.2503 g (0.0225 mol) of BTDA | 3.0036 g (0.015 mol) of 4,4'-diamino-diphenyl-ether | 1,000 | 0.42 |
| 55 | 13.9501 g (0.129 mol) of m-phenylene-diamine | 25.5828 g (0.126 mol) of isophthalic acid dichloride | 25.4999 g (0.252 mol) of triethylamine | 10,000 | 8.7002 g (0.027 mol) of BTDA | 4.8058 g (0.024 mol) of 4,4'-diamino-diphenyl-ether | 4,000 | 0.94 |
| 56 | ditto | ditto | ditto | 10,000 | 12.567 g (0.039 mol) of BTDA | 7.208 g (0.036 mol) of 4,4'-diamino-diphenyl-ether | 6,000 | 0.99 |
| 57 | ditto | ditto | ditto | 10,000 | 16.4337 g (0.051 mol) of BTDA | 9.6115 g (0.048 mol) of 4,4'-diamino-diphenyl-ether | 8,000 | 1.00 |
| 58 | ditto | ditto | ditto | 10,000 | 20.3005 g (0.063 mol) of BTDA | 12.0144 g (0.060 mol) of 4,4'-diamino-diphenyl-ether | 10,000 | 0.98 |
| 59 | 17.8431 g (0.165 mol) of m-phenylene-diamine | 31.9772 g (0.1575 mol) of isophthalic acid dichloride | 31.8748 g (0.315 mol) of triethylamine | 5,000 | 7.2503 g (0.0225 mol) of BTDA | 2.9741 g (0.015 mol) of 4,4'-diaminodiphenyl-methane | 1,000 | 0.90 |
| 60 | 18.3833 g (0.170 mol) of m-phenylene-diamine | 32.4848 g (0.160 mol) of isophthalic acid dichloride | 32.3808 g (0.320 mol) of triethylamine | 4,000 | 9.6669 g (0.030 mol) of BTDA | 4.004 g (0.02 mol) of 4,4'-diamino-diphenyl-ether | 1,000 | 0.45 |
| 61 | 21.0873 g (0.195 mol) of m-phenylene-diamine | 38.0681 g (0.1875 mol) of isophthalic acid dichloride | 37.9463 g (0.375 mol) of triethylamine | 6,000 | 7.2503 g (0.0225 mol) of BTDA | 3.0036 g (0.015 mol) of 4,4'-diamino-diphenyl-ether | 1,000 | 0.79 |
| 62 | 17.8431 g (0.165 mol) of m-phenylene-diamine | 31.9772 g (0.1575 mol) of isophthalic acid dichloride | 31.8748 g (0.315 mol) of triethylamine | 5,000 | 6.5439 g (0.030 mol) of pyromellitic acid dianhydride | 4.4611 g (0.0225 mol) of 4,4'-diaminodi-phenylmethane | 1,000 | 0.70 |
| 63 | 70.2910 g (0.650 mol) of m-phenylene-diamine | 121.818 g (0.60 mol) of isophthalic acid dichloride | 121.428 g (1.20 mols) of triethylamine | 3,000 | 112.780 g (0.350 mol) of BTDA | 60.072 g (0.30 mol) of 4,4'-diamino-diphenyl-ether | 3,000 | 1.17 |
| 64 | 9.7326 g (0.090 mol) of m-phenylene-diamine | 16.2424 g (0.080 mol) of isophthalic acid dichloride | 16.1904 g (0.160 mol) of triethylamine | 2,000 | 16.1108 g (0.050 mol) of BTDA | 8.008 g (0.04 mol) of 4,4'-diamino-diphenyl-ether | 2,000 | 0.96 |
| 65 | 8.0096 g (0.040 mol) of 4,4'-diamino-diphenyl-ether | 8.629 g (0.0425 mol) of isophthalic acid dichloride | 8.60 g (0.085 mol) of triethylamine | 5,500 | 3.2223 g (0.010 mol) of BTDA | 2.4784 g (0.0125 mol) of 4,4'-diaminodi-phenylmethane | 2,000 | 0.63 |
| 66 | 17.8431 g (0.160 mol) of m-phenylene-diamine | 31.9772 g (0.1575 mol) of isophthalic acid dichloride | 31.8748 g (0.315 mol) of triethylamine | 5,000 | 7.2502 g (0.0225 mol) of BTDA | 1.6221 g (0.015 mol) of m-phenylene-diamine | 1,000 | 0.82 |
| 67 | 8.0096 g (0.040 mol) of 4,4'-diamino-diphenyl-ether | 8.623 g (0.0425 mol) of isophthalic acid dichloride | 8.60 g (0.085 mol) of triethylamine | 5,500 | 2.1813 g (0.01 mol) of pyromellitic acid dianhydride | 2.4784 g (0.0125 mol) of 4,4'-diaminodi-phenylmethane | 2,000 | 0.45 |

The solution of the polyamide/polyamide-acid block copolymer prepared according to Example 37 can be converted, in a manner which is in itself known, by treatment with a mixture of acetic anhydride and pyridine (3:2 parts by volume) and subsequent precipitation in water or methanol, or directly by spray drying at 200°–300°C under nitrogen, into a powder of the corresponding polyamide-polyimide block copolymer, which is suitable for use as a compression moulding powder for the manufacture of mouldings.

EXAMPLE 68

3.9668 g (0.045 mol) of N,N'-dimethylethylenediamine and 9.1071 g (0.090 mol) of triethylamine are dissolved in 67 g of chloroform under nitrogen in an apparatus of the type described in Example 1, and the resulting clear soltuion is cooled to −20°C. Whilst maintaining this temperature, 9.1545 g (0.050 mol) of adipic acid dichloride, dissolved in 34 g of chloroform, are added dropwise over the course of 20 minutes. A clear, almost colourless, slightly viscous solution of a polyamide block with acid chloride end groups is obtained; $\bar{M}_{PA}$ approx. 2,000. Separately, 6.4446 g (0.020 mol) of 3,3',4,4'-benzophenonetetracarboxylic acid dianhydride are suspended in 33 g of N,N-dimethylacetamide under nitrogen. The resulting suspension is cooled to 0°C, after which 5.0060 g (0.025 mol) and 4,4'-diaminodiphenyl-ether, dissolved in 28 g of N,N-dimethylacetamide, are added dropwise at this temperature. A golden-coloured, clear, slightly viscous solution of a polyamide-acid block with amino end groups is produced. 94 g of N,N-dimethylacetamide are further added to this solution and the whole is stirred for a further hour at 25°C; $\overline{M}_{PAA}$ approx. 2,200.

Thereafter, the polyamide solution is added dropwise to the polyamide-acid solution at 15°–20°C and the mixture is stirred for a further hour at 25°C. The chloroform is then removed in a rotary evaporator at 30°C, whereupon the triethylamine hydrochloride formed precipitates in the form of fine needles. It is filtered off under nitrogen, by means of a glass frit. The resulting polyamide/polyamide-acid block copolymer is a yellow oil; $\eta_{inh}$. PA-PAA = 0.50 dl/g (c = 0.5% in DMA).

EXAMPLE 69

A polyamide-acid solution ($\overline{M}_{PAA}$ 2,000) is prepared according to the process described in Example 1, section B), from 1.908 g (0.00875 mol) of pyromellitic acid dianhydride, 1.4014 g (0.007 mol) of 4,4'-diaminodiphenyl-ether and 100 ml of anhydrous N,N-dimethylacetamide. Approx. 6.85 g of a polyamide block ($\overline{M}_{PAA}$ 4,000) obtained from 4.596 g (0.0425 mol) of m-phenylenediamine, 8.132 g (0.04 mol) of isophthalic acid dichloride and 4.239 g (0.04 mol) of anhydrous sodium carbonate by means of interfacial polycondensation, in a mixture of tetrahydrofurane, water and N,N-dimethylacetamide (in the ratio of 1:1:0.5 parts by volume) are added in portions to the above solution at 5°–20°C. A clear solution of a polyamide/polyamide-acid block copolymer, which is suitable for the manufacture of films, is produced.

EXAMPLE 70

A. Manufacture of a polyamide block with amino end groups 7.3535 g (0.068 mol) of m-phenylenediamine are dissolved in 185 g of anhydrous N,N-dimethylacetamide under nitrogen at room temperature in a 750 ml sulphonation flask provided with a stirrer, internal thermometer, dropping funnel with pressure compensator, and nitrogen inlet. A clear solution is obtained and is cooled to −15°C. At this temperature, 12.9939 g (0.064 mol) of isophthalic acid dichloride are added in portions, as a solid, in such a way that the temperature of the reaction mixture does not exceed −5°C. The reaction mixture is then stirred for 1 hour at −5°C and subsequently for 3 hours at approx. 25°C. A turbid, pale yellowish solution is produced, which becomes clear after adding a further 33 g of N,N-dimethylacetamide, This solution is cooled to 5°C, after which 12.9532 g (0.128 mol) of triethylamine are added dropwise at this temperature over the course of 20 minutes. Hereupon triethylamine hydrochloride separates out in the form of a white precipitate. The reaction mixture is warmed to approx. 25°C and the triethylamine hydrochloride is filtered off under nitrogen, using a glass frit. The filter cake which remains is thoroughly washed three times with a total of 75 g of N,N-dimethylacetamide; $\overline{M}_{PA}$ 4,000.

B. Manufacture of a polyamide-acid block with anhydride end groups 6.4446 g (0.020 mol) of benzophenone-tetracarboxylic acid dianhydride are suspended in 24 g of anhydrous N,N-dimethylacetamide under nitrogen in an apparatus of the type described above (capacity 350 ml). The resulting yellowish suspension is cooled to 0°C, after which a solution of 3.2038 g (0.016 mol) of 4,4'-diaminodiphenyl-ether in 23 g of anhydrous N,N-dimethylacetamide is added dropwise over the course of 30 minutes. The reaction mixture is stirred for one hour at approx. 25°C. A clear, dark yellow, slightly viscous polyamide-acid solution is obtained; $\overline{M}_{PAA}$ 2,000.

C. Manufacture of the polyamide-polyimide block copolymer

The polyamide-acid solution manufactured according to paragraph B) above is added over the course of 15 minutes, at room temperature (approx. 25°C), to the polyamide solution obtained according to section A). The reaction mixture is then stirred for 90 minutes at 25°C. A clear, slightly viscous, yellow polyamide/-polyamide-acid solution is obtained; $\eta_{inh}$. = 0.70 dl/g (c = 0.5% in DMA).

To manufacture a compression moulding powder, the polyamide/polyamide-acid solution is added dropwise, under nitrogen, to 350 g of a mixture of 3 parts by volume of pyridine and 2 parts by volume of acetic anhydride and the whole is stirred for 20 hours at approx. 25°C. A yellow, jelly-like suspension is produced. This is added dropwise to 5.6 l of water and the resulting suspension is homogenised with a "Turrax" mixer. The resulting yellow powder is filtered off, taken up in 2 l of water and again homogenised in the mixer. This operation is repeated once more, after which the filter residue is dried for 16 hours at 125°C/100 mm Hg and subsequently for 24 hours at 200°C/0.01 mm Hg. After grinding, 23 g of compression moulding powder of the corresponding polyamide-polyimide block copolymer are obtained.

A compression moulding powder can also be obtained by adding the polyamide/polyamide-acid solution manufactured according to the above example dropwise at approx. 25°C to 2 1° of a mixture of 1 part by volume of water and 1 part by volume of methanol, whilst stirring vigorously. A fibrous product precipitates, which is left in the precipitant for 16 hours and is then filtered off. The polyamide/polyamide-acid block copolymer obtained is then cyclised in a drying cabinet, under a good vacuum, at a temperature between 70 and 200°C, and the resulting product is subsequently mechanically comminuted.

EXAMPLE 71

A polyamide solution according to Example 70, section (A), is prepared, without however filtering off the triethylamine hydrochloride, and a polyamide-acid solution prepared according to Example 53, section (B), is added to the former solution. The reaction mixture is stirred for 1 hour at 25°C and then filtered. a clear, slightly viscous, yellow solution is obtained, which is concentrated at approx. 25°C/ 0.001 mm Hg to a final weight of 84 g. The resulting 30% strength (% by weight) viscous solution is suitable for the manufacture of laminates; $\overline{M}_{PA}$ 4,000, $\overline{M}_{PAA}$ 2,000; $\eta_{inh}$. = 0.70 dl/g (c = 0.5% in DMA).

EXAMPLE 72

A. Manufacture of a polyamide block with acid chloride end groups

A polyamide block with acid chloride end groups is manufactured by reacting 8.629 g (0.0425 mol) of isophthalic acid dichloride and 4.326 g (0.04 mol) of m-phenylenediamine with addition of 8.60 g (0.085 mol) of triethylamine, at −20° to −15°C, in anhydrous N,N-dimethylacetamide, in the manner described in Example 1A.

B. Manufacture of a polyamide-acid block with amino end groups

A polyamide-acid block with amino end groups is manufactured by reacting 2.503 g (0.0125 mol) of 4,4'-diaminodiphenyl-ether and 2.181 g (0.01 mol) of pyromellitic acid dianhydride in anhydrous N,N-dimethylacetamide in the manner described in Example 1B.

C. Manufacture of the polyamide/polyamide-acid block copolymer

Thereafter, the polyamide and polyamide-acid solutions obtained according to (A) to (B) are combined with one another at −5°C to +20°C, and are reacted to give a polyamide/polyamide acid block copolymer, as described in Example 1C; $\overline{M}_{PA}$ 4,000, $\overline{M}_{PAA}$ 2,000; $\eta_{inh.}$ PA-PI = 0.85 dl/g (c = 0.5% in concentrated $H_2SO_4$).

EXAMPLE 73

Glass fibre fabric (for example so-called E-glass with an aminosilane finish) is impregnated with the polymer solution manufactured according to Example 71 by passing the fabric one through the polymer solution. Thereafter, the impregnated fabric is dried in a drying cabinet as follows: For 3 hours at 70°C/50 mm Hg, for 2 hours at 100°C/50 mm Hg, for 2 hours at 130°C/50 mm Hg, then for 8 hours at 150°C/ 20 mm Hg and finally for 5 horus at 200°C/$10^{-2}$ mm Hg. Several of the dried prepregs obtained are stacked on top of one another and then pressed in a sheet press at 300°C to give laminates, under the following conditions: 1 minute contact pressure; 1 minute 10 kp/cm²; 1 minute 15 kp/cm²; 1 minute 30 kp/cm². Laminates of good bond strength and flexural strength are obtained.

EXAMPLE 74

The compression moulding powder manufactured according to Example 70 is introduced loose, or in the form of tablets which have been pre-compacted cold, into a compression mould for standard bars and is pressed at 300°C under the following conditions: 15 minutes contact pressure, then an increase in pressure to 1,000 kp/cm² over the course of 2 minutes, and maintenance of this pressure for 5 minutes. Thereafter, the compression mould is cooled under load to 200°C and the samples are released. Transparent, bubble-free compression mouldings of good flexural strength are obtained.

To manufacture sheets, a thin layer of the above fine powder is introduced into a circular compression mould and compacted at a temperature of 150°C and a pressure of 500 kp/cm². Thereafter, the resulting preformed disc is pressed under the following condition in a sheet press at 300°C; 3 minutes contact pressure, 1 minute 30 kp/cm² and 1 minute 40 kp/cm². Bubble-free, transparent sheets are obtained.

EXAMPLE 75

The compression moulding powder manufactured according to Example 70 is applied uniformly to the ground and degreased surface of aluminium strip. A second, analogously pretreated, aluminum strip is then placed on the powder layer and the whole is bonded in a sheet press under the following conditions at a temperature of 300°C: 1 minute 350 kp/cm², 1 minute 550 kp/cm² and 1 minute 900 kp/cm². An adhesive bond of good dry shear strength (approx. 1.3 kg/mm² at 23°C) is obtained, which is unchanged after aging for 100 hours in a circulating ari over at 250°C.

Steel sheets and copper sheets can also be glued analogously to one another.

EXAMPLE 76

A 25% strength solution of the polyamide/polyamide-acid block copolymer obtained according to Example 63, in anhydrous N,N-dimethylacetamide, is spun on a dry spinning installation, at a tunnel temperature of 250°C, to give fibres. For complete imidisation, the fibres are briefly heated in vacuo to 300°C. Fibres of good tensile strength are obtained.

EXAMPLE 77

500 ml of a 10% strength solution of the polyamide/polyamide-acid block copolymer obtained according to Example 51, in anhydrous N,N-dimethylacetamide, are mixed with 250 ml of acetic anhydride and 250 ml of pyridine. The reaction mixture is stirred for 15 minutes at room temperature (approx. 25°C), whereupon a voluminous precipitate forms. The reaction mixture is then poured into a large excess of water whilst stirring vigorously and the product which has precipitated is filtered off, rinsed with water and dried for 24 hours at 50°C/100 mm Hg and 24 hours at 50°C/$10^{-1}$ mm Hg. After grinding in a ball mill, the completely imidised (cyclised) block polymer is obtained in the form of a fine yellowish powder; $\eta$ $_{inh.}$ of the polyamide-polyimide block copolymer = 0.70 dl/g (c = 0.5% in concentrated $H_2SO_4$); glass transition temperature of the powder Tg = 270°C.

50 g of this powder are dissolved in 1,000 ml of anhydrous N,N-dimethylacetamide at approx. 25°C, whilst stirring. Glass fibre fabric (for example so-called E-glass with an aminosilane finish) is impregnated with this solution and briefly dried at 120°C/300 mm Hg. This process is repeated once more. The resulting prepregs are subsequently dried for 16 hours at 200°C/$10^{-1}$ mm Hg; resin content of the completely dried prepregs: 24% by weight. Several of these prepregs are stacked on top of one another and pressed in a sheet press for 4 minutes at 310°C and 45 kp/cm². A firmly bonded laminate of good flexural strength is obtained.

EXAMPLE 78

The polyamide/polyamide-acid solutions obtained according to Examples 42, 43, 47, 51–53, 59 and 62 are converted into compression moulding powders in the manner described in Example 70.

The resulting finely ground compression moulding powders are in each case loosely filled into a compression mould for standard bars which is preheated to 315°C and are pressed for 3 minutes under contact pressure and at a temperature between 312° and 317°C. The pressure is then raised to 500 kp/cm² over the course of 30 seconds and is maintained for approx. 5 minutes. The compression mould is then cooled to 200°C under load and the samples are released from the mould. Bubble-free, transparent compression mouldings having the flexural strengths (at 23°C) indicated in Table III below are obtained.

Table III

| Compression moulding from block copolymer according to Example No. | Flexural strength, kg/mm² | Flexural strength after heat treatment at 240°C, kg/mm² | Flexural strength after aging in a circulating air oven for 100 hours at 250°C, kg/mm² |
|---|---|---|---|
| 42 | 16 | 19 | — |
| 43 | 8.4 | — | 16.8 |
| 47 | 9 | 16 | 18.6 |
| 51 | 24.8 | Unchanged | 24.3 |
| 52 | 11 | — | 14.6 |
| 53 | 22.6 | — | — |
| 59 | 33.8 | — | — |
| 62 | 17.5 | — | — |

What we claim is:
1. Polyamide/polyamide-acid block copolymers consisting of recurring structural units of the formula I

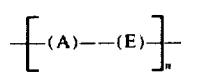  (1)

wherein $n$ represents an integer from 1 to 500, A represents a polyamide block of average molecular weight 350 to 20,000 and having a base unit of the formula II or III

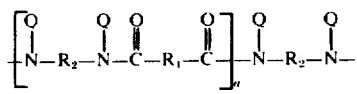  (II)

or

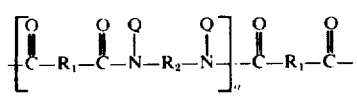  (III)

and E represents a polyamide-acid block with an average molecular weight of 750 to 20,000 and a base unit of the formula IV or V

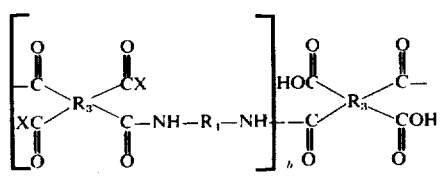  (IV)

or

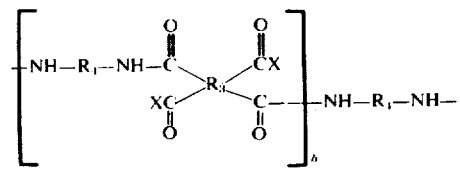  (V), wherein $a$ is an integer from 8 to 100 and $b$ is an integer from 2 to 100, $R_2$ and $R_4$ independently of one another denote a monocyclic, a condensed polycyclic or uncondensed bicyclic aromatic radical in which latter radical the aromatic nuclei are linked to one another through a bridge member, or denote a heterocyclic radical, an aliphatic radical with at least two carbon atoms, a cycloaliphatic radical or an araliphatic radical, $R_1$ represents an aliphatic radical with at least two carbon atoms or a cycloaliphatic, carbocyclic-aromatic or heterocyclic radical, the carbonyl groups being bonded to different carbon atoms, $R_3$ represents a cycloaliphatic, carbocyclic-aromatic or heterocyclic radical, wherein the carbonyl groups are bonded to different ring carbon atoms adjoining one another in pairs, X denotes a hydroxyl, alkoxy or aryloxy group or a radical of the formula

and $Y_1$ and $Y_2$ independently of one another denote hydrogen or an alkyl, cycloalkyl, aryl, or aralkyl radical and the radicals

are each located on a ring carbon atom adjoining the carbonamide group and Q denotes hydrogen or an alkyl or aryl radical, and the derivatives cyclised to the corresponding polyamide-polyimide block copolymers.

2. Polyamide/polyamide-acid block copolymers according to claim 1 of the formula I, wherein A represents a polyamide block of the formula III or a polyamide block of the formula II and E represents a polyamide-acid block of the formula V, or a polyamide-acid block of the formula IV, wherein $a$ denotes an integer from 8 to 50 and $b$ denotes an integer from 2 to 50, $R_2$ and $R_4$ independently of one another denote a monocyclic aromatic radical which is optionally substituted by hydrogen atoms or alkyl or alkoxy groups with 1 to 4 carbon atoms, an unsubstituted monocyclic araliphatic radical or an unsubstituted aliphatic radical possessing 2 to 10 carbon atoms, $R_1$ denotes an unsubstituted saturated alkylene radical with 2 to 4 carbon atoms or an unsubstituted monocyclic aromatic radical, with the carbonyl groups being bonded to different carbon atoms, $R_3$ represents an optionally halogen-substituted monocyclic, condensed polycyclic or uncondensed bicyclic aromatic radical, in which bicyclic aromatic radical the aromatic nuclei are linked to one another via the

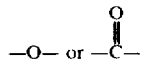

bridge member and the carbonyl groups are bonded to different ring carbon atoms adjacent to one another in pairs, X represents the hydroxyl group and the

radicals are each on a ring carbon atom adjacent to the carbonamide group and Q represents hydrogen, as well as the derivatives cyclised to the corresponding polyamide-polyimide block copolymers.

3. Polyamide/polyamide-acid block copolymers according to claim 2 of the formula I, wherein A represents a polyamide block of the formula III or a polyamide block of the formula II and E represents a polyamide-acid block of the formula V, or a polyamide-acid block of the formula IV, wherein $R_2$ and $R_4$ independently of one another represent an uncondensed bicyclic aromatic radical which is optionally substituted by halogen atoms or alkyl or alkoxy groups with 1 to 4 carbon atoms each and in which the aromatic nuclei are bonded to one another via the —O— or —CH$_2$— bridge member, and $a$, $b$, $R_1$, $R_3$, X and Q have the meaning indicated in claim 2, as well as the derivatives cyclised to the corresponding polyamide-polyimide block copolymers.

4. Polyamide/polyamide-acid block copolymers according to claim 1 of the formula I, wherein A represents a polyamide block of the formula II and E represents a polyamide-acid block of the formula IV, wherein $a$ denotes an integer from 8 to 50 and $b$ denotes an integer from 2 to 50, $R_1$ represents the radical of the formula —CH$_2$—CH$_2$—CH$_2$—CH$_2$— or the 1,3-phenylene radical, $R_2$ represents the 4,4'-diphenylyl-ether or 1,3-phenylene radical, $R_3$ represents a benzene ring or the benzophenone ring system, $R_4$ represents the 4,4'-diphenylyl-ether, 4,4'-diphenylylmethane or 1,3- or 1,4-phenylene radical, X represents the hydroxyl group and Q represents hydrogen, as well as the derivatives cyclised to the corresponding polyamide-polyimide block copolymers.

5. A polyamide-polyamide-acid block copolymer as claimed in claim 1 wherein A represents a polyamide block having structural units of the formula

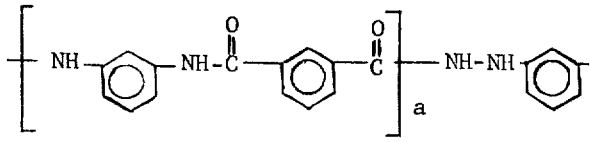

wherein $a$ represents an integer from 8 to 50, and E represents a polyamide-acid block having structural units of the formula

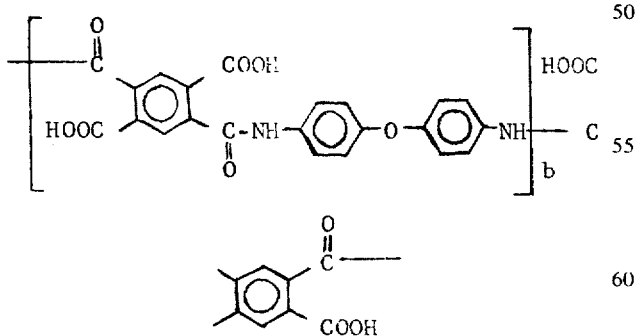

wherein $b$ represents an integer from 2 to 50.

6. A polyamide-polyamide-acid block copolymer as claimed in claim 1 wherein A represents a polyamide block having structural units of the formula

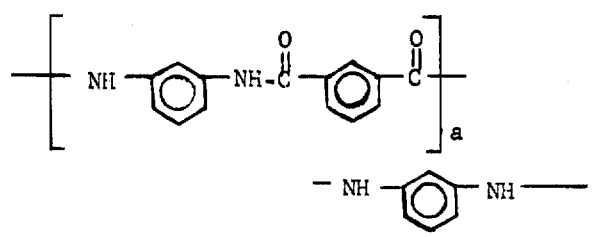

wherein $a$ represents an integer from 8 to 50, and E represents a polyamide-acid block having structural units of the formula

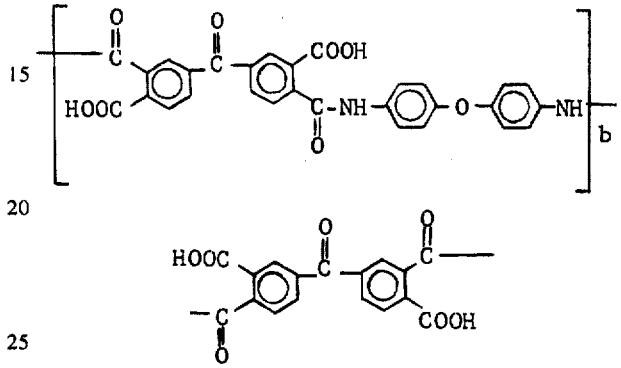

wherein $b$ represents an integer from 2 to 50.

7. A polyamide-polyamide-acid block copolymer as claimed in claim 1 wherein A represents a polyamide block having structural units of the formula

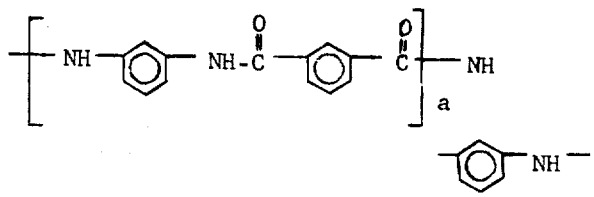

wherein $a$ represents an integer from 8 to 50, and E represents a polyamide-acid block having structural units of the formula

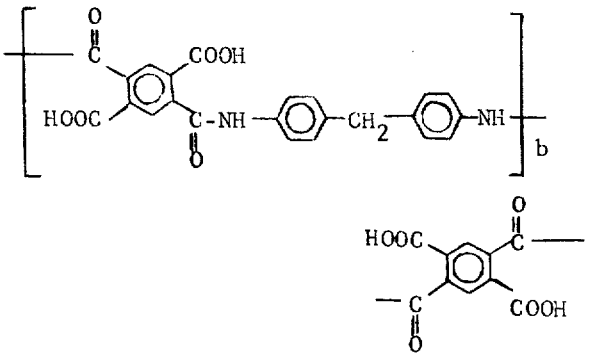

wherein $b$ represents an integer from 2 to 50.

8. A polyamide-polyamide-acid block copolymer as claimed in claim 1 wherein A represents a polyamide block having structural units of the formula

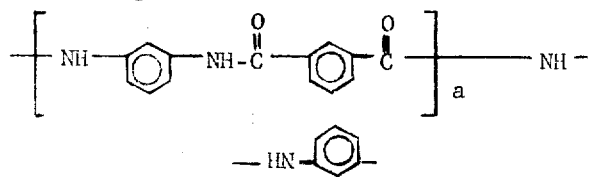

wherein *a* represents an integer from 8 to 50, and E represents a polyamide-acid block having structural units of the formula

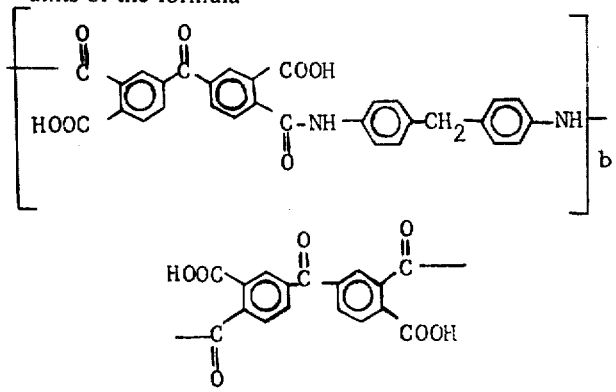

wherein *b* represents an integer from 2 to 50.

9. A polyamide-polyamide-acid block copolymer as claimed in claim 1 wherein A represents a polyamide block having structural units of the formula

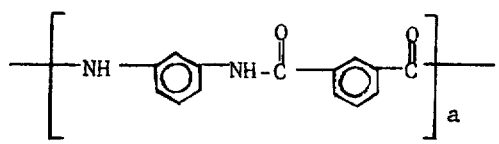

wherein *a* represents an integer from 8 to 50, and E represents a polyamide-acid block having structural units of the formula

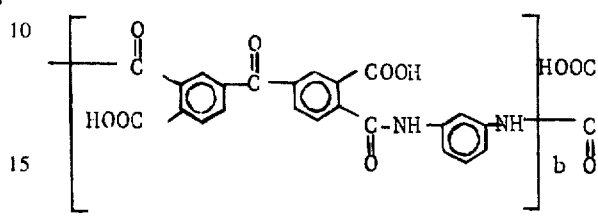

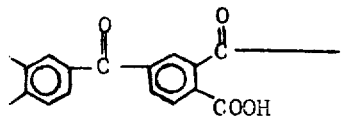

wherein *b* represents an integer from 2 to 50.

* * * * *